(12) United States Patent
Wang et al.

(10) Patent No.: US 12,349,717 B2
(45) Date of Patent: Jul. 8, 2025

(54) AUTOMATIC SEPARATOR FOR PEEL AND PULP OF HOLBOELLIA LATIFOLIA WALL

(71) Applicant: CHINA AGRICULTURAL UNIVERSITY, Beijing (CN)

(72) Inventors: Wei Wang, Beijing (CN); Yao Lu, Beijing (CN); Shuxian Song, Beijing (CN); Qinglin Wang, Beijing (CN); Beibei Jia, Beijing (CN); Yi Yang, Beijing (CN)

(73) Assignee: China Agricultural University, Beijing (CN)

( * ) Notice: Subject to any disclaimer, the term of this patent is extended or adjusted under 35 U.S.C. 154(b) by 843 days.

(21) Appl. No.: 17/284,959

(22) PCT Filed: Jul. 17, 2020

(86) PCT No.: PCT/CN2020/102605
§ 371 (c)(1),
(2) Date: Mar. 15, 2022

(87) PCT Pub. No.: WO2021/013074
PCT Pub. Date: Jan. 28, 2021

(65) Prior Publication Data
US 2022/0192248 A1    Jun. 23, 2022

(30) Foreign Application Priority Data

Jul. 19, 2019 (CN) .......................... 201910653671.0

(51) Int. Cl.
*A23N 7/08* (2006.01)
*A23N 7/00* (2006.01)

(52) U.S. Cl.
CPC .................. *A23N 7/08* (2013.01); *A23N 7/00* (2013.01); *A23N 2007/007* (2013.01)

(58) Field of Classification Search
CPC ........... A47J 7/00; A47J 7/08; A47J 2007/007
(Continued)

(56) References Cited

U.S. PATENT DOCUMENTS 3,884,137 A * 5/1975 Breton ..................... A23N 5/00
198/623
4,509,414 A * 4/1985 Chiu ....................... A23N 15/02
99/623
(Continued)

FOREIGN PATENT DOCUMENTS

CN    102160677 A    8/2011
CN    104939280 A    9/2015
(Continued)

OTHER PUBLICATIONS

PCT/CN2020/102605 International Search Report dated Sep. 30, 2020.

*Primary Examiner* — Reginald Alexander
(74) *Attorney, Agent, or Firm* — Thomas E. Lees, LLC

(57) ABSTRACT

An automatic separator for peel and pulp of *Holboellia latifolia* Wall is provided: the cooperation between a pressure roller set (9) and a scraping plate (11) is used for pressing and separating the peel and pulp of *Holboellia latifolia* Wall; a shell (2) surrounded by four rectangular plates which are perpendicular to each other and fixedly connected end to end is fixedly connected outside the table-shaped frame (14), two side rectangular plates (22) of the shell (2) are symmetrically provided with peel outlets (20), a screen table (18) is installed on the top of the pressure roller frame, two groups of automatic pressure roller adjusting devices (6) are provided at both sides of the screen table (18), respectively, and a pressure roller installing platform (5) is placed above the four automatic pressure roller adjusting devices (6) through grooves installed below a frame. The automatic separator with rational structural design which (Continued)

cuts *Holboellia latifolia* Wall into two halves through a knife half-cutting device (6), and which utilizes the extrusion force and the counter-acting force from rollers (91) to classify the peel and pulp in a peel outlet (13) and a seed pulp box (12) respectively, and which makes the processing under a stable and reliable condition.

11 Claims, 4 Drawing Sheets

(58) Field of Classification Search
USPC .................................. 99/585, 591, 593, 625
See application file for complete search history.

(56) References Cited

U.S. PATENT DOCUMENTS

| | | | |
|---|---|---|---|
| 4,549,479 A | | 10/1985 | Harter et al. |
| 5,033,372 A | * | 7/1991 | Silvestrini .............. A23N 7/005 |
| | | | 99/623 |

FOREIGN PATENT DOCUMENTS

| | | |
|---|---|---|
| CN | 104000294 B | 12/2015 |
| CN | 104544483 B | 5/2016 |
| CN | 107006869 A | 8/2017 |
| CN | 207978893 U | 10/2018 |
| CN | 109380736 A | 2/2019 |
| CN | 209031139 U | 6/2019 |
| CN | 110338434 B | 7/2020 |
| KR | 200440336 Y1 | 6/2008 |

* cited by examiner

AUTOMATIC SEPARATOR FOR PEEL AND PULP OF HOLBOELLIA LATIFOLIA WALL

This application claims the priority of PCT Patent Application No. PCT/CN2020/102605, entitled "Automatic Separator for Peel and Pulp of *Holboellia Latifolia* Wall" filed Jul. 17, 2020, which claims priority to CN201910653671.0, entitled "Automatic Separator for Peel and Pulp of *Holboellia Latifolia* Wall" filed Jul. 19, 2019, which are both incorporated herein by reference in their entirety.

TECHNICAL FIELD

The present disclosure belongs to the technical field of agricultural machinery, in particular to an automatic separator for peel and pulp of *Holboellia latifolia* Wall.

BACKGROUND

*Holboellia latifolia* Wall is sweet and rich in sugar, vitamin C and 12 kinds of amino acids, which has high edible value and medicinal value. In addition, modern medical research has found that some compounds in *Holboellia latifolia* Wall can play a positive role in the prevention and treatment of cancer, which is the rare king of health-care fruits. *Holboellia latifolia* Wall is a treasure, peel can be dried to make health tea; pulp can be used as drink, wine, or direct consumption; seeds can extract oil, which are the best feedstock of the health-care edible oil.

At present, the enterprise processing and production chain for *Holboellia latifolia* Wall has not been formed. Especially, the problem that it is difficult to separate peel from pulp cannot be solved, which leads to the inability of independently intensive processing. However, the existing peeler or huller is mainly suitable for nuts or apples, which cannot adapt to the characteristics of hard peel and soft pulp of *Holboellia latifolia* Wall and its unique crescent shape.

In view of the above problems, an automatic separator for peel and pulp of *Holboellia latifolia* Wall is designed, which can quickly separate peel and pulp of *Holboellia latifolia* Wall and which realizes a better separation effect and a higher working efficiency while ensuring the preferable separation integrity of peel and pulp of *Holboellia latifolia* Wall, and which provides an effective method to exploit the market value of *Holboellia latifolia* Wall.

SUMMARY

In order to solve the difficulty of separating the peel and pulp for *Holboellia latifolia* Wall and the low efficiency of manual separation, the present disclosure provides an automatic separator for peel and pulp of *Holboellia latifolia* Wall, comprising: a shell, a knife half-cutting device, a pressure roller installing platform, an automatic pressure roller adjusting device, a brush roller set, a pressure roller set, a chain, a scraping plate and a seed pulp box, a pressure roller frame, a table-shaped frame, a scraping device, a pressure roller driving motor, a turbine reducer, a screen table and a *Holboellia latifolia* Wall size recognition system; wherein the cooperation between the pressure roller set and the scraping plate is used for pressing and separating the peel and pulp of *Holboellia latifolia* Wall; the table-shaped frame is formed by fixedly connecting an upper horizontal table plate and four table legs fixed below the horizontal table plate, a shell surrounded by four rectangular plates which are perpendicular to each other and fixedly connected end to end is fixedly connected outside the table-shaped frame, two side rectangular plates of the shell are symmetrically provided with peel outlets, the planes where two disc cutters in the knife half-cutting device are located are symmetrical, two pressure roller frames and two seed pulp boxes are symmetrically installed back to back along the symmetrical plane above a bottom rectangular plate; the screen table is installed on the top of the pressure roller frame, two groups of automatic pressure roller adjusting devices are provided at both sides of the screen table respectively, and the pressure roller installing platform with a rectangular frame shape is placed above the four automatic pressure roller adjusting devices through grooves installed below a frame; the center of the top rectangular plate is provided with a material inlet, both sides of the material inlet are marked with standard lines which are perpendicular to the symmetry plane; and the *Holboellia latifolia* Wall size recognition system is connected with the automatic pressure roller adjusting devices;

the knife half-cutting device is bolted to the center of the horizontal table plate, a feeding barrel in the knife half-cutting device extends out of the top rectangular plate through a material inlet on the top rectangular plate; and two connecting plates below a half-dividing guide plate of the knife half-cutting device are respectively bolted with the inner side of a screen table;

the brush roller set and four pressure roller sets are installed above the pressure roller installing platform sequentially and side by side from inside to outside; the scraping plate is installed in the screen table, the scraping device is installed below the screen table; and transmission sprockets are provided on the same side of the brush roller set and the four pressure roller sets;

the pressure roller driving motor and the turbine reducer are installed on one side of the pressure roller frame and are located on the same side of the transmission sprocket, the input shaft and output shaft of the turbine reducer are connected with the output shaft of the pressure roller driving motor and the driving sprocket respectively, and a chain for transmitting torque is sequentially provided between the driving sprocket and each transmission sprocket.

The *Holboellia latifolia* Wall size recognition system consists of a CCD camera, an industrial control computer and a single chip microcomputer; the CCD camera is installed on the discharging barrel of the knife half-cutting device; the CCD camera, the industrial control computer, the single chip microcomputer and a micro electric control lifting platform in the automatic pressure roller adjusting device are sequentially connected; the CCD camera is installed at the outer side of the discharging barrel; and the micro electric control lifting platform in the automatic pressure roller adjusting device is controlled by the single chip microcomputer to adjust the height of the upper and lower parts.

The knife half-cutting device is used to cut *Holboellia latifolia* Wall into two halves and comprises a feeding barrel, a half-dividing guide plate, a discharging barrel, two circular cutter devices and a barrel fixing plate; the feeding barrel, the annular barrel fixing plate and the discharging barrel are fixedly connected sequentially from top to bottom, the inlet at the upper end of the feeding barrel is thicker, and the outlet at the lower end is thinner; the inlet at the upper end of the discharging barrel is thinner, the outlet at the lower end is thicker, and the joint between the inner wall of the feeding barrel and that of the discharging barrel is flat and smooth; the barrel fixing plate is installed above the horizontal table plate of the table-shaped frame or on both sides of the discharging barrel by bolts, two circular cutter devices are oppositely provided on both sides of the feeding barrel and the discharging barrel, and extend into the feeding barrel and the discharging barrel through yielding cutter grooves provided on both sides of the feeding barrel, the barrel fixing plate and the discharging barrel, and the top end of the half-dividing guide plate extends into the discharging barrel, but is not in contact with the two disc cutters extending into the discharging barrel;

the circular cutter device comprises a disc cutter, a cutter motor and a cutter motor bracket; the cutter motor bracket is installed under the horizontal table plate of the table-shaped frame through bolts, the cutter motor is installed in the cutter motor bracket, and a disc cutter is directly connected with the power output shaft of the cutter motor through a cutter shaft connector; and two disc cutters in the knife half-cutting device are tangent.

The half-dividing guide plate comprises a connecting plate, a chute, a baffle plate, a reinforcing rib, a hinge and a half-dividing sheet, wherein two rectangular chutes are rotatably connected by a hinge provided inside the top end of the chute, the upper end face of the chute is welded with a half-dividing sheet, the two half-dividing sheets are seamlessly bonded to separate *Holboellia latifolia* Wall still stuck after being cut in half; the lower end of the chute is fixedly connected with a strip-shaped connecting plate, and two baffle plates are vertically fixedly connected above two sides of the chute respectively.

A limit centering device is provided above the feeding barrel, the limit centering device consists of arc-shaped limiting members, collars, springs, connecting rings and arc-shaped clamping members, characterised in that said each component concerns three identical parts, two adjacent limiting members are connected by upper and lower springs, three arc-shaped limiting members installed by the springs enclose a frustum-shaped centering space, the axis of the centering space is the tangent of two disc cutters, thus ensuring that the falling position of the *Holboellia latifolia* Wall faces the position between two disc cutters; the collars above the three arc-shaped limiting members are connected through a collar connecting ring, and both ends of the collar connecting ring are in sliding connection with one arc-shaped limiting member;

the upper and lower ends of the arc-shaped limiting member are fixedly connected with a collar and an arc-shaped clamping member respectively, a feeding barrel fixing opening allowing the feeding barrel to pass through is left below the collar, and a limit centering device is sleeved on the upper edge of the feeding barrel through three feeding barrel fixing openings.

The automatic pressure roller adjusting device consists of four micro electric control lifting tables and fixing screws, the left and right sets of automatic pressure roller adjusting devices are symmetrically distributed along the plane where the two disc cutters are located; wherein four micro electric control lifting platforms are rectangular mounted in a rectangular chute on both sides of the screen table through fixing screws.

The pressure roller set comprises a pressure roller, a pressure roller shaft, a bearing seat and a transmission sprocket; the bearing seat is installed above the side of the pressure roller installing platform by bolts, both ends of the pressure roller shaft are rotatably connected with a bearing seat through a bearing respectively; a transmission sprocket is installed at one end of the pressure roller shaft through a pin shaft, the pressure roller shaft is installed in the pressure roller through key connection; and the periphery of the pressure roller is provided with pressure roller grains at equal intervals along the radial direction.

The four pressure roller sets are a pressure roller bringing-in set, a first pressure roller peel and pulp separating set, a second pressure roller peel and pulp separating set and a pressure roller peel grinding set in the order from inside to outside, respectively; wherein the pressure roller bringing-in set is a first part for bringing the half-cut *Holboellia latifolia* Wall into the pressure roller device; the first pressure roller peel and pulp separating set and the second pressure roller peel and pulp separating set are the second part for separating the peel and pulp of the *Holboellia latifolia* Wall; the pressure roller peel grinding set is a third part for grinding out the peel;

the diameter of the pressure roller of the four pressure roller sets is 65 to 85 mm;

the height of the axis of each pressure roller shaft of the four pressure roller sets is as follows:

$$w = \frac{p}{x+q} + z + b$$

in the formula, p=2642, q=35.55, x is the coordinate of X axis, z is the diameter of the pressure roller, and b is the thickness of peel (4 mm<b<9 mm).

The brush roller set comprises a brush roller, a pressure roller shaft, a bearing seat and a transmission sprocket; the bearing seat is installed above the side of the pressure roller installing platform by bolts, both ends of the pressure roller shaft are rotatably connected with a bearing seat through a bearing respectively; a transmission sprocket is installed at one end of the pressure roller shaft through a pin shaft, the pressure roller shaft is installed in the brush roller through key connection; and brush bundles are uniformly installed on the outer peripheral surface of the pressure roller.

The scraping device comprises a scraper, a scraper motor, a scraper motor bracket and a scraper installing shaft, wherein the scraper motor bracket is fixedly connected below the screen table, the scraper motor is installed on the scraper motor bracket, a power output shaft of the scraper motor is fixedly connected with the scraper installing shaft, and the scraper installing shaft faces the center of the scraping plate; the scraper is uniformly installed on the scraper installing shaft, and the scraper is in contact with the bottom surface of the scraping plate.

The method has the following beneficial effects.

(1) The present disclosure realizes the mechanical structure innovation of the separator for peel and pulp of *Holboellia latifolia* Wall, while it fills the blank of the separator for peel and pulp of *Holboellia latifolia* Wall. The separator cuts *Holboellia latifolia* Wall into two halves through the knife half-cutting device. The innovative design of the half-dividing guide plate enables it to slide between the pressure roller and the screen. Utilizing the extrusion force and the counter-acting force from rollers, the pulp seeds fall into a seed pulp box, and the peel of *Holboellia latifolia* Wall slides out from the peel outlet, thus realizing the separation of peel and pulp of the *Holboellia latifolia* Wall The automatic separator with rational structural design ensures the processing under a stable and reliable condition.

(2) The present disclosure finishes the design of the control system, which can adjust the distance between the roller and the screen according to the size of *Holboellia latifolia* Wall, and it is suitable for separation of peel and pulp of *Holboellia latifolia* Wall of various sizes, such as large, medium and small sizes. This system requires no grading before processing, and it is good in universality and high in degree of automation.

Figure 1:
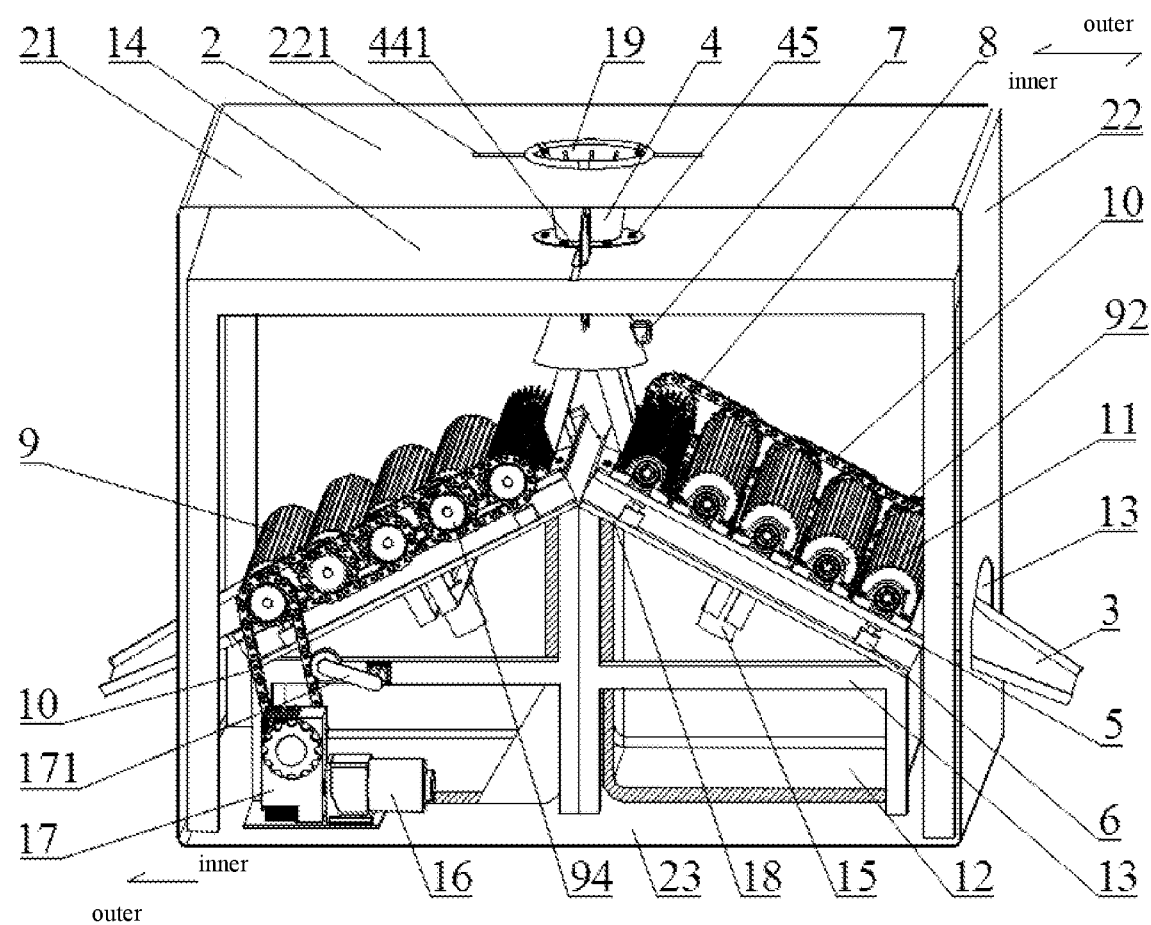
FIG. 1 is a structural schematic diagram of an embodiment of an automatic separator for peel and pulp of *Holboellia latifolia* Wall according to the present disclosure.

In the figures:
2—shell, 3—peeling plate, 4—knife half-cutting device, 5—pressure roller installing platform, 6—automatic pressure roller adjusting device, 7—CCD camera, 8—brush roller set, 9—pressure roller set, 10—chain, 11—scraping plate, 12—seed pulp box, 13—pressure roller frame, 14—table-shaped frame, 15—scraping device, 16—pressure roller driving motor, 17—turbine reducer, 18—screen table, 19—centering device, 21—top rectangular plate, 22—side rectangular plate, 23—bottom rectangular plate, 41—feeding barrel, 42—half-dividing guide plate, 43—discharging barrel, 44—circular cutter device, 45—barrel fixing plate, 46—yielding cutter groove, 81—brush roller, 82—brush bundle, 91—pressure roller, 92—pressure roller shaft, 93—bearing seat, 94—transmission sprocket, 95—pressure roller grain, 151—scraper, 152—scraper motor, 153—scraper motor bracket, 154—scraper installing shaft, 601—micro electric control lifting platform, 171—elastic tension pulley, 191—arc-shaped limiting member, 192—collar, 193—spring, 194—collar connecting ring, 195—arc-shaped clamping member, 211—standard line, 441—disc cutter, 442—cutter motor, 443—cutter motor bracket, 421—connecting plate, 422—chute, 423—baffle plate, 424—reinforcing rib, 425—hinge, 426—half-dividing sheet.

DETAILED DESCRIPTION

In order to make the object, technical scheme and advantages of the present disclosure clearer, the present disclosure will be described clearly and completely with reference to the attached drawings and specific embodiments.

The embodiment shown in FIG. 1-FIG. 6 comprises: a shell 2, a knife half-cutting device 4, a pressure roller installing platform 5, an automatic pressure roller adjusting device 6, a *Holboellia latifolia* Wall size recognition system, a brush roller set 8, a pressure roller set 9, a chain 10, a scraping plate 11 and a seed pulp box 12, a pressure roller frame 13, a table-shaped frame 14, a scraping device 15, a pressure roller driving motor 16, a turbine reducer 17, and a screen table 18; wherein the cooperation between the pressure roller set 9 and the scraping plate 11 is used for pressing and separating the peel and pulp of *Holboellia latifolia* Wall; the table-shaped frame 14 is formed by fixedly connecting an upper horizontal table plate and four table legs fixed below the horizontal table plate, a shell 2 surrounded by four rectangular plates which are perpendicular to each other and fixedly connected end to end is fixedly connected outside the table-shaped frame 14, a space with a height not greater than that of the feeding barrel 41 in the knife half-cutting device 4 is provided between the top rectangular plate 21 and the horizontal table plate; two side rectangular plates 22 of the shell 2 are symmetrically provided with peel outlets 13, the plane where two disc cutters 441 in the knife half-cutting device 4 are located is a symmetrical plane, two pressure roller frames 13 and two seed pulp boxes 12 are symmetrically installed back to back along the symmetrical plane above a bottom rectangular plate 23; the screen table 18 is installed on the top of the pressure roller frame 13, two groups of automatic pressure roller adjusting devices 6 are provided at both sides of the screen table 18, respectively, the pressure roller installing platform 5 with a rectangular frame shape is placed above the four automatic pressure roller adjusting devices 6 through grooves installed below a frame, and the CCD camera 7 in the *Holboellia latifolia* Wall size recognition system is installed on the discharging barrel 43 of the knife half-cutting device 4; and the *Holboellia latifolia* Wall size recognition system is connected with the micro electric control lifting platform 601 in the automatic pressure roller adjusting device 6;

the brush roller set 8 and four pressure roller sets 9 are installed above the pressure roller installing platform 5 sequentially and side by side from inside to outside; the scraping plate 11 is installed in the screen table 18, the scraping device 15 is installed below the screen table 18; and transmission sprockets 94 are provided on the same side of the brush roller set 8 and the four pressure roller sets 9;

the knife half-cutting device 4 is bolted to the center of the horizontal table plate, a feeding barrel 41 in the knife half-cutting device 4 extends out of the top rectangular plate 21 through a material inlet on the top rectangular plate 21; and two connecting plates 421 below a half-dividing guide plate 42 of the knife half-cutting device 4 are respectively bolted with the inner side of a screen table 18;

the pressure roller driving motor 16 and the turbine reducer 17 are installed on one side of the pressure roller frame 13 and are located on the same side of the transmission sprocket 94, the input shaft and output shaft of the turbine reducer 17 are respectively connected with the output shaft of the pressure roller driving motor 16 and the driving sprocket, and a chain 10 for transmitting torque is sequentially provided between the driving sprocket and each transmission sprocket 94.

In this embodiment, an elastic tension pulley 171 is provided on the pressure roller frame 13 near the turbine reducer 17 to adapt to the up-and-down movement of the pressure roller installing platform 5 and the pressure roller set 9. The elastic tension pulley 171 is installed on the chain 10 of the power output of the turbine reducer 17. The length of the chain 10 can be adaptively adjusted when the distance between the pressure roller 9 and the screen is changed.

In this embodiment, the included angle between the scraping plate 11 with the inner side higher than the outer side and the horizontal plane is 30-45 degrees.

In this embodiment, the scraping plate 11 is uniformly provided with pulp scraping holes, and the area of the pulp scraping holes is about three times that of the seeds of the *Holboellia latifolia* Wall, which is more conducive to the passage of the pulp of the *Holboellia latifolia Wall*.

In this embodiment, the shell 2 with rectangular shape can realize the separator regularization design and the whole separator packaging.

In this embodiment, the peeling plates 3 are fixedly connected to the outer sides of the two pressure roller installing platforms 5. The peeling plate is provided with wide ends and narrow ends. The wide ends of the peeling plate 3 are fixedly connected to the outer sides of the pressure roller installing platforms, while the narrow ends extend out of the shell 2 through the peel outlet 13, and a peel receiving box is placed under the narrow ends.

As shown in FIG. 1, the center of the top rectangular plate 21 is provided with a material inlet. Both sides of the material inlet are marked with standard lines 211 which are perpendicular to the symmetry plane, so that it is convenient to adjust the feeding angle of the *Holboellia latifolia* Wall and realize its equal cutting in half; the center of the horizontal table plate is further provided with a half-cutting device installing opening. Both sides of the half-cutting device installing opening are respectively provided with a disc cutter groove.

Figure 2:
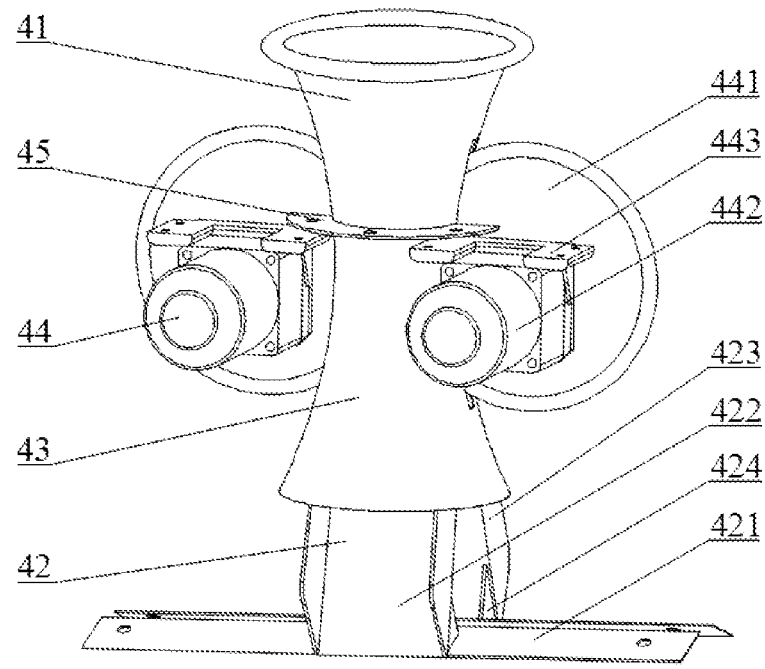
FIG. 2 is a schematic perspective diagram of a half-cutting device according to an embodiment of the present disclosure.
Figure 3:
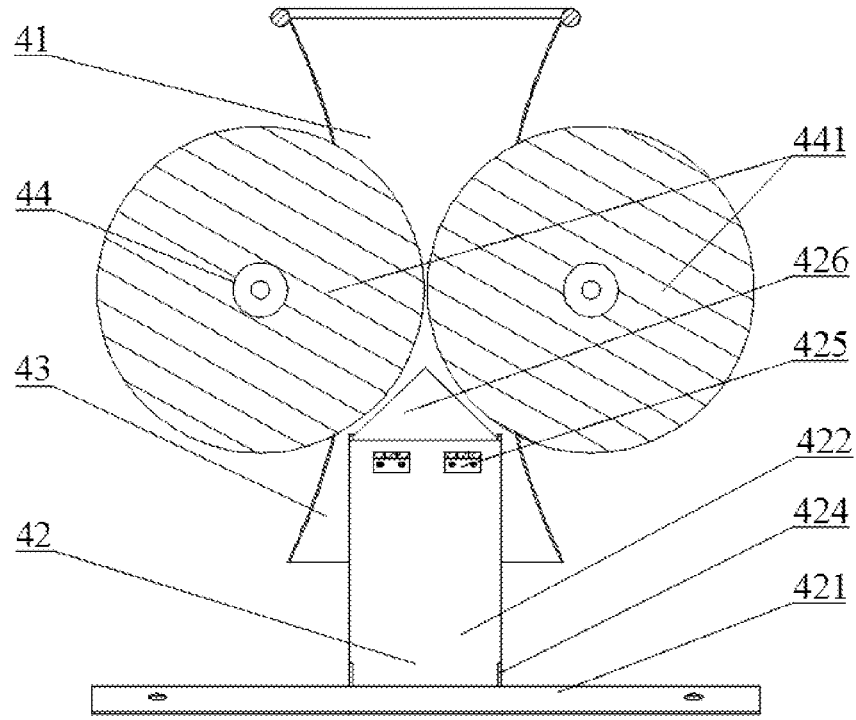
FIG. 3 is a cross-sectional diagram of a half-cutting device according to an embodiment of the present disclosure.

As shown in FIG. 1-FIG. 3, the knife half-cutting device 4 is used to cut *Holboellia latifolia* Wall into two halves, comprising a feeding barrel 41, a half-dividing guide plate 42, a discharging barrel 43, two circular cutter devices 44 and a barrel fixing plate 45; the feeding barrel 41, the annular barrel fixing plate 45 and the discharging barrel 43 are fixedly connected sequentially from top to bottom, the inlet at the upper end of the feeding barrel 41 is thicker, and the outlet at the lower end is thinner; the inlet at the upper end of the discharging barrel 43 is thinner, the outlet at the lower end is thicker, and the joint between the inner wall of the feeding barrel 41 and that of the discharging barrel 43 is flat and smooth; the barrel fixing plate 45 is installed above the horizontal table plate of the table-shaped frame 14 or on both sides of the discharging barrel 43 by bolts, two circular cutter devices 44 are oppositely provided on both sides of the feeding barrel 41 and the discharging barrel 43, and extend into the feeding barrel 41 and the discharging barrel 43 through yielding cutter grooves 46 provided on both sides of the feeding barrel 41, the barrel fixing plate 45 and the discharging barrel 43, and the top end of the half-dividing guide plate 42 extends into the discharging barrel 43, but is not in contact with the two disc cutters 441 extending into the discharging barrel 43.

The circular cutter device 44 comprises a disc cutter 441, a cutter motor 442 and a cutter motor bracket 443; the cutter motor bracket 443 is installed under the horizontal table plate of the table-shaped frame 14 through bolts, the cutter motor 442 is installed in the cutter motor bracket 443, and a disc cutter 441 is directly connected with the power output shaft of the cutter motor 442 through a cutter shaft connector; and two disc cutters 441 in the knife half-cutting device 4 are tangent.

The half-dividing guide plate 42 comprises a connecting plate 421, a chute 422, a baffle plate 423, a reinforcing rib 424, a hinge 425 and a half-dividing sheet 426, wherein two rectangular chutes 422 are rotatably connected by a hinge 425 provided inside the top end of the chute 422, and a certain angle exists between the two chutes 422, the upper end face of the chute 422 is welded with a half-dividing sheet 426. The two half-dividing sheets 426 are seamlessly bonded to separate *Holboellia latifolia* Wall still stuck after being cut in half, so as to ensure that the *Holboellia latifolia* Wall cut in half by the circular cutter device 44 can smoothly enter the working range of the brush roller sets 8 on both sides; the lower end of the chute 422 is fixedly connected with a strip-shaped connecting plate 421, and a baffle plate 423 is respectively vertically fixedly connected above two sides of the chute 422 to prevent the *Holboellia latifolia* Wall from slipping out from the sides.

In this embodiment, the inner diameter of the barrel fixing plate 45 (i.e., the diameter at the smallest position of the feeding barrel 41 and the discharging barrel 43) is 70-80 mm, but if the size of a special *Holboellia latifolia* Wall exceeds this range, the size of the largest *Holboellia latifolia* Wall shall prevail.

In this embodiment, a reinforcing rib 424 is fixedly connected between the chute 422 and the connecting plate 421.

Figure 4:
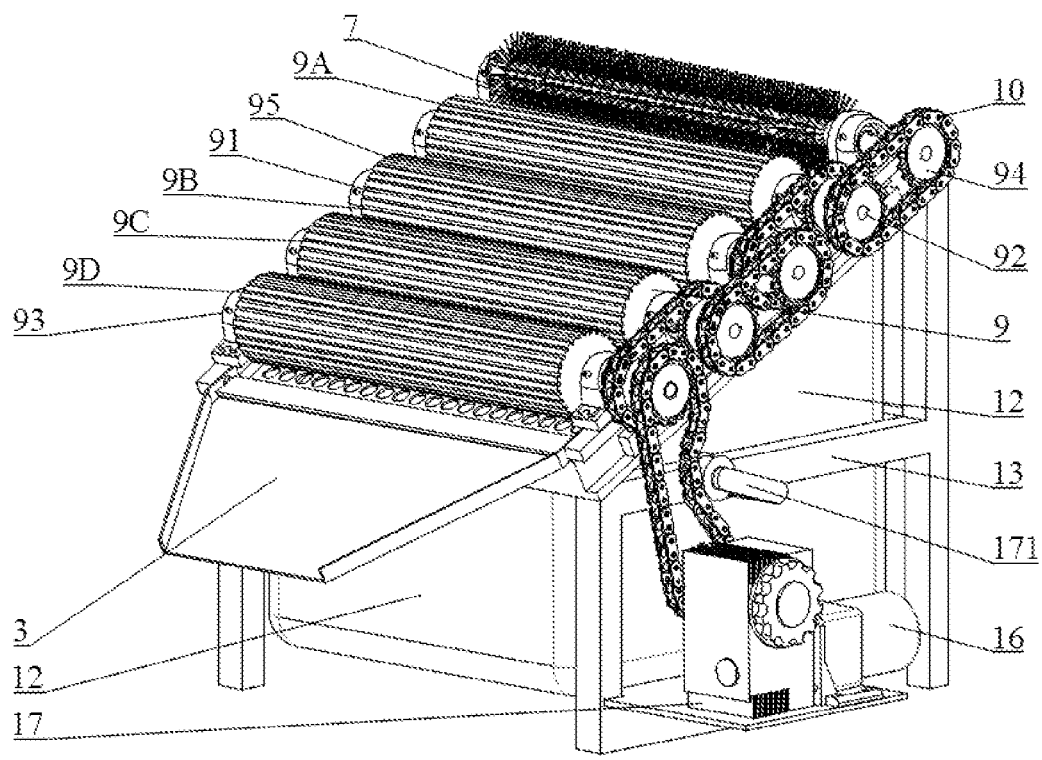
FIG. 4 is a partial schematic perspective diagram according to an embodiment of the present disclosure.
Figure 5:
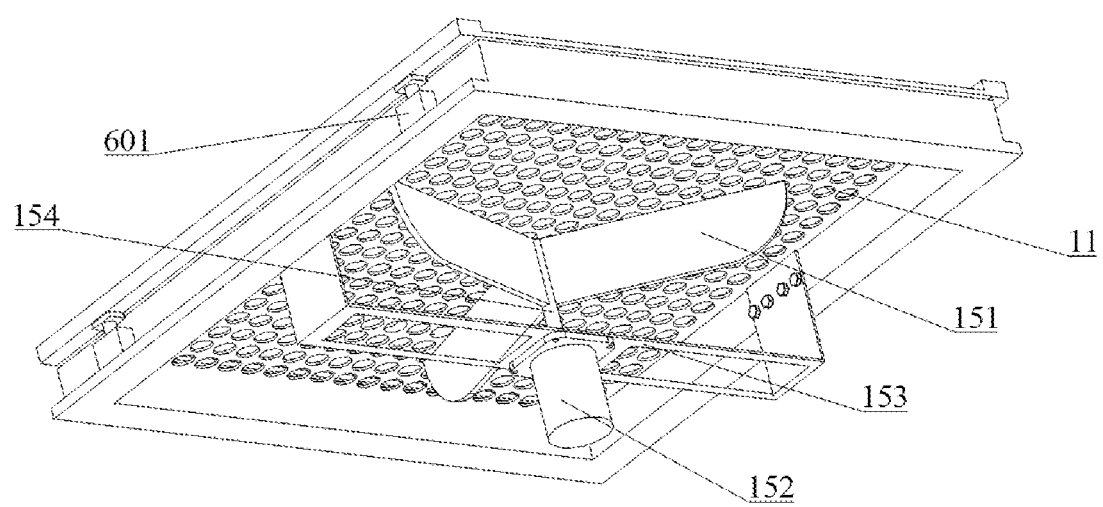
FIG. 5 is a schematic perspective diagram of a scraping device according to an embodiment of the present disclosure.

As shown in FIG. 1, FIG. 4 and FIG. 5, the *Holboellia latifolia* Wall size recognition system consists of a CCD camera 7, an industrial control computer and a single chip microcomputer; the CCD camera 7, the industrial control computer, the single chip microcomputer and a micro electric control lifting platform 601 are sequentially connected; and the CCD camera 7 is installed at the outer side of the discharging barrel 43 and faces the chute 422 and the disc cutter 441. After the CCD camera 7 collects the image of the half-cut *Holboellia latifolia* Wall, it transmits the image to the industrial control computer. The industrial control computer processes the image information to determine the size grade of *Holboellia latifolia* Wall, and transmits the size signal of *Holboellia latifolia* Wall to the single chip microcomputer control system. The micro electric control lifting platform 601 in the automatic pressure roller adjusting device 6 is controlled by the single chip microcomputer to adjust the height of the upper and lower parts, thus realizing the real-time adjustment of the distance between the pressure roller 9 and the screen.

In this embodiment, the industrial control computer divides *Holboellia latifolia* Wall into five grades according to its size (thickness), then converts the collected size signals of *Holboellia latifolia* Wall into corresponding grades according to the set range of peel thickness b, and sends them to the single chip microcomputer. Finally, the single chip microcomputer controls the micro electric control lifting platform to rise to the height of the corresponding grade according to the received grade.

As shown in FIG. 1 and FIG. 4, the automatic pressure roller adjusting device 6 consists of four micro electric control lifting tables 601 and fixing screws thereof. Since four left pressure roller sets 9 and four right pressure roller sets 9 are symmetrically distributed along the plane where the two disc cutters 441 are located, the left and right automatic pressure roller adjusting devices 6 are also symmetrically distributed along the plane where the two disc cutters 441 are located; wherein four micro electric control lifting platforms 601 are installed in rectangular chutes in a rectangular shape on both sides of the screen table 18 through fixing screws. There are eight micro electric control lifting tables 601 on both sides, each of which is driven by a stepping motor to rotate its internal roller screw, so as to realize the ascending and descending of the micro platform at the other end of the screw. Each micro electric control lifting table can independently receive the control signal of the single chip microcomputer to adjust the height of the upper and lower parts of the pressure roller; that is to say, according to the signal given by the single chip microcomputer control system, the corresponding action is performed, and the distance between the pressure roller 9 and the screen table can be automatically adjusted with the size change of the fed *Holboellia latifolia* Wall.

As shown in FIG. 1 and FIG. 4, the pressure roller set 9 comprises a pressure roller 91, a pressure roller shaft 92, a bearing seat 93 and a transmission sprocket 94; the bearing seat 93 is installed above the side of the pressure roller installing platform 5 by bolts, both ends of the pressure roller shaft 92 are respectively rotatably connected with a bearing seat 93 through a bearing; a transmission sprocket 94 is installed at one end of the pressure roller shaft 92 through a pin shaft, the pressure roller shaft 92 is installed in the pressure roller 91 through key connection; and the periphery of the pressure roller 91 is provided with pressure roller grains 95 at equal intervals along the radial direction.

In this embodiment, the pressure roller grain 95 is linear, and the grooved section is rectangular. However, because the peel juice of *Holboellia latifolia* Wall is bitter, it is necessary to ensure the integrity of the peel in order to ensure the good taste of the separated pulp. Therefore, the concave pressure roller grain 95 can be replaced by linear or wavy line rubber ridges, which are flexible and elastic, so as to ensure the quality of peel and pulp during the separation of peel and pulp by rolling *Holboellia latifolia* Wall.

Figure 7:
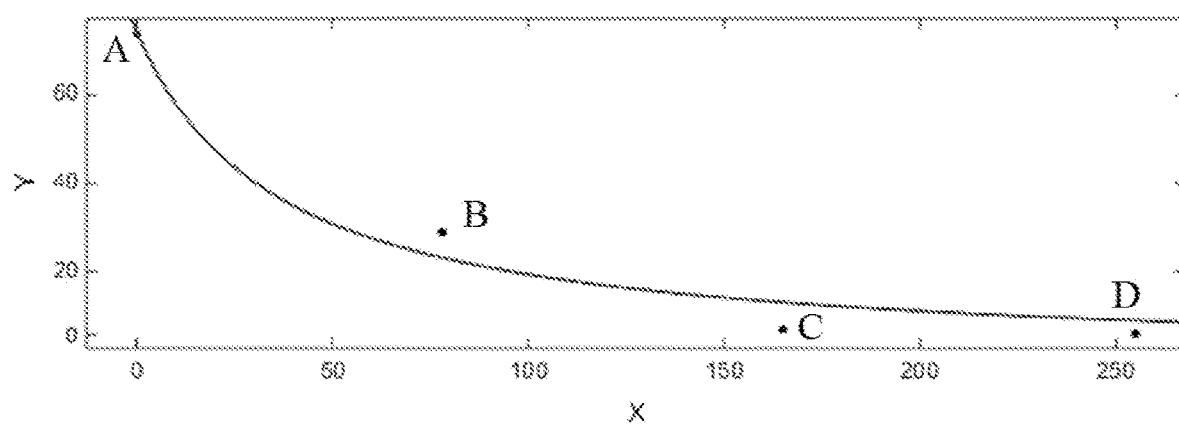
FIG. 7 is a schematic diagram of the positional relationship of the axes of four pressure rollers according to an embodiment of the present disclosure.

As shown in FIG. 4 and FIG. 7, the four pressure roller sets 9 have the following position relationship. The four pressure roller sets 9 are respectively a pressure roller bringing-in set 9A, a first pressure roller peel and pulp separating set 9B, a second pressure roller peel and pulp separating set 9C and a pressure roller peel grinding set 9D in the order from inside to outside; wherein the axis of the pressure roller shaft 92 in the pressure roller bringing-in set 9A is point A, the axis of the pressure roller shaft 92 in the first pressure roller peel and pulp separating set 9B is point B, the axis of the pressure roller shaft 92 in the second pressure roller peel and pulp separating set 9C is point C, and the axis of the pressure roller shaft 92 in the pressure roller peel grinding set 9D is point D. The line segment CD is parallel to the plane where the screen table 18 is located; the straight line passing through the line segment CD is X axis, the straight line perpendicular to line segment CD and passing through point A is Y axis, and the orthogonal coordinate system is established with the intersection of two axes as origin. The fitting equation obtained by curve fitting the coordinates of points A, B, C and D using MATLAB is as follows.

Specifically, the line segment AB, the line segment BC and the line segment CD (the linear distance between each roller) is set to 90 mm; the straight line passing through the line segment CD is X axis, the straight line perpendicular to the line segment CD and passing through point A is Y axis, and the orthogonal coordinate system is established with the intersection of two axes as origin. The fitting equation obtained by curve fitting the coordinates of points A, B, C and D using MATLAB is:

$$y = \frac{p}{x+q}$$

In the formula, p=2642, q=35.55, y is the y-axis coordinate (height), and x is the x-axis coordinate (distance to the axis of the pressure roller 91 in the pressure roller bringing-in set 9A in the direction of the scraping plate 11); the accuracy of the fitting curve equation can reach 98%, and the fitting effect meets the design accuracy requirements;

In this embodiment, according to the installation position and the positional relationship therebetween, the diameter change range z of the roller is determined to be 65 to 85 mm, and with the increase of the diameter of the roller, the roller gap becomes smaller and the rolling effect is better; specifically, the pressure roller 91 with a diameter of 80 mm is uniformly used.

During installation and debugging, the basic distance w between the axis of the pressure roller shaft 92 and the scraping plate 11 in each pressure roller set 9 is:

$$w=y+z+b$$

wherein the thickness b of the peel varies from 4 mm to 9 mm.

Therefore, the height of the axis of each pressure roller shaft 92 in the four pressure roller sets 9 is:

$$w = \frac{p}{x+q} + z + b$$

During operation, the pressure roller bringing-in set 9A is a first part for bringing the half-cut *Holboellia latifolia* Wall into the pressure roller device; the first pressure roller peel and pulp separating set 9B and the second pressure roller peel and pulp separating set 9C are the second part for separating the peel and pulp of the *Holboellia latifolia* Wall, that is, the peel and pulp are pressed under the scraping plate 11 so that the peel stays above the scraping plate 11, while the pulp pressed under the scraping plate 11 fall into the pulp box; the pressure roller peel grinding set 9D is a third part for grinding out the peel.

As shown in FIG. 1 and FIG. 4, the brush roller set 8 has the same main structure as the pressure roller set 9, comprising a brush roller 81 having an outer diameter smaller than that of the pressure roller 91, a pressure roller shaft 92, a bearing seat 93 and a transmission sprocket 94; the bearing seat 93 is installed above the side of the pressure roller installing platform 5 by bolts, both ends of the pressure roller shaft 92 are respectively rotatably connected with a bearing seat 93 through a bearing; a transmission sprocket 94 is installed at one end of the pressure roller shaft 92 through a pin shaft, the pressure roller shaft 92 is installed in the brush roller 81 through key connection; and brush bundles 82 are uniformly installed on the outer peripheral surface of the pressure roller 91.

In this embodiment, the brush roller set 8 and the pressure roller set 9 use the same pressure roller shaft, the same bearing seat and the same transmission sprocket.

In this embodiment, the number of transmission sprockets 94 provided on the pressure roller shaft 9 is determined according to the actual transmission demand. Specifically, the brush roller set 8 comprises a transmission sprocket 94.

As shown in FIGS. 1, 4 and 5, the scraping device 15 comprises a scraper 151, a scraper motor 152, a scraper motor bracket 153 and a scraper installing shaft 154, wherein the scraper motor bracket 153 is fixedly connected below the screen table 18, the scraper motor 152 is installed on the scraper motor bracket 153, a power output shaft of the scraper motor 152 is fixedly connected with the scraper installing shaft 154, and the scraper installing shaft 154 faces the center of the scraping plate 11; several scrapers 151 are installed on the scraper installing shaft 154 and is uniformly distributed along the circumferential direction of the scraper installing shaft 154. The scraper 151 and the scraper motor bracket 153 do not interfere with each other, and the scraper 151 is in contact with the bottom surface of the scraping plate 11.

In this embodiment, there are three scrapers 151, and the scraper motors 152 need to be sealed.

Figure 6:
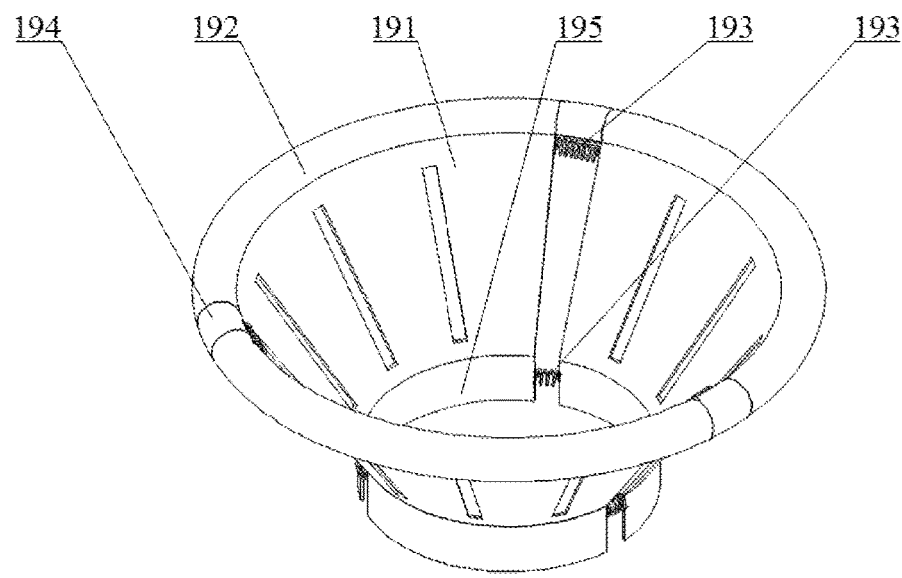
FIG. 6 is a schematic perspective diagram of a limit centering device according to an embodiment of the present disclosure.

As shown in FIG. 1 and FIG. 6, a limit centering device 19 is provided above the feeding barrel 41, the limit centering device consists of three identical arc-shaped limiting members 191, a collar 192, a spring 193, a collar connecting ring 194 and an arc-shaped clamping member 195, two adjacent limiting members 191 are connected by upper and lower springs 193, three arc-shaped limiting members 191 installed by the springs 193 enclose a frustum-shaped centering space, the axis of the centering space is the tangent of two disc cutters 441, thus ensuring that the falling position of the *Holboellia latifolia* Wall faces the position between two disc cutters 441; the collars 192 above the three arc-shaped limiting members 191 are connected through a collar connecting ring 194, and both ends of the collar connecting ring 194 are in sliding connection with one arc-shaped limiting member 191.

The upper and lower ends of the arc-shaped limiting member 191 are respectively fixedly connected with a collar 192 and an arc-shaped clamping member 195, a feeding barrel fixing opening allowing the feeding barrel 41 to pass through is left below the collar 192, and a limit centering device 19 is sleeved on the upper edge of the feeding barrel 41 through three feeding barrel fixing openings.

The workflow of this embodiment is as follows.

The standard line 3 on the shell 2 is used as the center line, the *Holboellia latifolia* Wall is put into the limit centering device 19, and the two disc cutters 441 divide the *Holboellia latifolia* Wall into two parts, and slide onto the left and right scraping plates 11 under the action of the half-dividing guide plate 42; in the process of sliding down, the CCD camera 7 collects the image information of *Holboellia latifolia* Wall, and transmits it to the industrial control computer. The industrial control computer determines the large, medium and small grades of *Holboellia latifolia* Wall according to the image information and outputs signals to the single chip microcomputer control system. The single chip microcomputer control system controls the micro electric control lifting platform 601 to carry out synchronous lifting action, and the distance between the pressure roller 9 and the screen is automatically adjusted to a proper size.

*Holboellia latifolia* Wall sliding onto the left and right scraping plates 11 are simply cleaned by the brush roller set 8, and then is automatically and sequentially fed into the working range of the four pressure roller sets 9; under the squeezing action of the pressure roller 91 and the scraping plate 11, the pulp seeds of the *Holboellia latifolia* Wall leak from the circular pulp scraping holes on the scraping plate 11. The scraper 151 cleans the shed pulp seeds at any time, and the pulp seeds fall into the seed pulp box 12. Under the rotating action of the outermost set of pressure roller sets 9, the peel is discharged above the scraping plate 11 through the peel outlet 13.

What is claimed is:

1. An automatic separator for peel and pulp of *Holboellia latifolia* Wall, comprising: a shell (2), a knife half-cutting device (4), a pressure roller installing platform (5), an automatic pressure roller adjusting device (6), a brush roller set (8), a pressure roller set (9), a chain (10), a scraping plate (11) and a seed pulp box (12), a pressure roller frame (13), a table-shaped frame (14), a scraping device (15), a pressure roller driving motor (16), a turbine reducer (17), a screen table (18) and a *Holboellia latifolia* Wall size recognition system; wherein the cooperation between the pressure roller set (9) and the scraping plate (11) is used for pressing and separating the peel and pulp of *Holboellia latifolia* Wall; the table-shaped frame (14) is formed by fixedly connecting an upper horizontal table plate and four table legs fixed below the horizontal table plate, a shell (2) surrounded by four rectangular plates which are perpendicular to each other and fixedly connected end to end is fixedly connected outside the table-shaped frame (14), two side rectangular plates (22) of the shell (2) are symmetrically provided with peel outlets (20), the plane where two disc cutters (441) in the knife half-cutting device (4) are located is a symmetrical plane, two pressure roller frames (13) and two seed pulp boxes (12) are symmetrically installed back to back along the symmetrical plane above a bottom rectangular plate (23); the screen table (18) is installed on the top of the pressure roller frame (13), a groups of automatic pressure roller adjusting devices (6) are provided at both sides of the screen table (18), respectively, and the pressure roller installing platform (5) with a rectangular frame shape is placed above the four automatic pressure roller adjusting devices (6) through grooves installed below a frame; the center of the top rectangular plate (21) is provided with a material inlet, both sides of the material inlet are marked with standard lines (211) which are perpendicular to the symmetry plane; and the *Holboellia latifolia* Wall size recognition system is connected with the automatic pressure roller adjusting device (6);

the knife half-cutting device (4) is bolted to the center of the horizontal table plate, a feeding barrel (41) in the knife half-cutting device (4) extends out of the top rectangular plate (21) through a material inlet on the top rectangular plate (21); and two connecting plates (421) below a half-dividing guide plate (42) of the knife half-cutting device (4) are respectively bolted with the inner side of a screen table (18);

the brush roller set (8) and four pressure roller sets (9) are installed above the pressure roller installing platform (5) sequentially and side by side from inside to outside; the scraping plate (11) is installed in the screen table (18), the scraping device (15) is installed below the screen table (18); and transmission sprockets (94) are provided on the same side of the brush roller set (8) and the four pressure roller sets (9);

the pressure roller driving motor (16) and the turbine reducer (17) are installed on one side of the pressure roller frame (13) and are located on the same side of the transmission sprocket (94), the input shaft and output shaft of the turbine reducer (17) are respectively connected with the output shaft of the pressure roller driving motor (16) and the driving sprocket, and a chain (10) for transmitting torque is sequentially provided between the driving sprocket and each transmission sprocket (94).

2. The automatic separator for peel and pulp of *Holboellia latifolia* Wall according to claim 1, wherein the *Holboellia latifolia* Wall size recognition system consists of a CCD camera (7), an industrial control computer and a single chip microcomputer; the CCD camera (7) is installed on the discharging barrel (43) of the knife half-cutting device (4); the CCD camera (7), the industrial control computer, the single chip microcomputer and a micro electric control lifting platform (601) in the automatic pressure roller adjusting device (6) are sequentially connected; the CCD camera (7) is installed at the outer side of the discharging barrel (43); and the micro electric control lifting platform (601) in the automatic pressure roller adjusting device (6) is controlled by the single chip microcomputer to adjust the height of the upper and lower parts.

3. The automatic separator for peel and pulp of *Holboellia latifolia* Wall according to claim 1, wherein the knife half-cutting device (4) is used to cut *Holboellia latifolia* Wall into two halves and comprises a feeding barrel (41), a half-dividing guide plate (42), a discharging barrel (43), two circular cutter devices (44) and a barrel fixing plate (45); the feeding barrel (41), the annular barrel fixing plate (45) and the discharging barrel (43) are fixedly connected sequentially from top to bottom, the inlet at the upper end of the feeding barrel (41) is thicker, and the outlet at the lower end is thinner; the inlet at the upper end of the discharging barrel (43) is thinner, the outlet at the lower end is thicker, and the joint between the inner wall of the feeding barrel (41) and that of the discharging barrel (43) is flat and smooth; the barrel fixing plate (45) is installed above the horizontal table plate of the table-shaped frame (14) or on both sides of the discharging barrel (43) by bolts, two circular cutter devices (44) are oppositely provided on both sides of the feeding barrel (41) and the discharging barrel (43), and extend into the feeding barrel (41) and the discharging barrel (43) through yielding cutter grooves (46) provided on both sides of the feeding barrel (41), the barrel fixing plate (45) and the discharging barrel (43), and the top end of the half-dividing guide plate (42) extends into the discharging barrel (43), but is not in contact with the two disc cutters (441) extending into the discharging barrel (43);

the circular cutter device (44) comprises a disc cutter (441), a cutter motor (442) and a cutter motor bracket (443); the cutter motor bracket (443) is installed under the horizontal table plate of the table-shaped frame (14) through bolts, the cutter motor (442) is installed in the cutter motor bracket (443), and a disc cutter (441) is directly connected with the power output shaft of the cutter motor (442) through a cutter shaft connector; and two disc cutters (441) in the knife half-cutting device (4) are tangent.

4. The automatic separator for peel and pulp of *Holboellia latifolia* Wall according to claim 3, wherein the half-dividing guide plate (42) comprises a connecting plate (421), a chute (422), a baffle plate (423), a reinforcing rib (424), a hinge (425) and a half-dividing sheet (426), wherein two rectangular chutes are rotatably connected by a hinge (425) provided inside the top end of the chute (422), the upper end face of the chute (422) is welded with a half-dividing sheet (426), the two half-dividing sheets (426) are seamlessly bonded to separate *Holboellia latifolia* Wall still stuck after being cut in half; the lower end of the chute (422) is fixedly connected with a strip-shaped connecting plate (421), and a baffle plate (423) is respectively vertically fixedly connected above two sides of the chute (422).

5. The automatic separator for peel and pulp of *Holboellia latifolia* Wall according to claim 1 or 3, wherein a limit centering device (19) is provided above the feeding barrel (41), the limit centering device consists of three identical arc-shaped limiting members (191), a collar (192), a spring (193), a collar connecting ring (194) and an arc-shaped clamping member, two adjacent limiting members (191) are connected by upper and lower springs (193), three arc-shaped limiting members (191) installed by the springs (193) enclose a frustum-shaped centering space, the axis of the centering space is the tangent of two disc cutters (441), thus ensuring that the falling position of the *Holboellia latifolia* Wall faces the position between two disc cutters (441); the collars (192) above the three arc-shaped limiting members (191) are connected through a collar connecting ring (194), and both ends of the collar connecting ring (194) are in sliding connection with one arc-shaped limiting member (191);

the upper and lower ends of the arc-shaped limiting member (191) are respectively fixedly connected with a collar (192) and an arc-shaped clamping member (195), a feeding barrel fixing opening allowing the feeding barrel (41) to pass through is left below the collar (192), and a limit centering device (19) is sleeved on the upper edge of the feeding barrel (41) through three feeding barrel fixing openings.

6. The automatic separator for peel and pulp of *Holboellia latifolia* Wall according to claim 1, wherein the automatic pressure roller adjusting device (6) consists of four micro electric control lifting tables (601) and fixing screws thereof, the left and right sets of automatic pressure roller adjusting devices (6) are also symmetrically distributed along the plane where the two disc cutters (441) are located; wherein four micro electric control lifting platforms (601) are installed in rectangular chutes in a rectangular shape on both sides of the screen table (18) through fixing screws.

7. The automatic separator for peel and pulp of *Holboellia latifolia* Wall according to claim 1, wherein the pressure roller set (9) comprises a pressure roller (91), a pressure roller shaft (92), a bearing seat (93) and a transmission sprocket (94); the bearing seat (93) is installed above the side of the pressure roller installing platform (5) by bolts, both ends of the pressure roller shaft (92) are respectively rotatably connected with a bearing seat (93) through a bearing; a transmission sprocket (94) is installed at one end of the pressure roller shaft (92) through a pin shaft, the pressure roller shaft (92) is installed in the pressure roller (91) through key connection; and the periphery of the pressure roller (91) is provided with pressure roller grains (95) at equal intervals along the radial direction.

8. The automatic separator for peel and pulp of *Holboellia latifolia* Wall according to claim 1, wherein the four pressure roller sets (9) are respectively a pressure roller bringing-in set (9A), a first pressure roller peel and pulp separating set (9B), a second pressure roller peel and pulp separating set (9C) and a pressure roller peel grinding set (9D) in the order from inside to outside; wherein the pressure roller bringing-in set (9A) is a first part for bringing the half-cut *Holboellia latifolia* Wall into the pressure roller device; the first pressure roller peel and pulp separating set (9B) and the second pressure roller peel and pulp separating set (9C) are the second part for separating the peel and pulp of the *Holboellia latifolia* Wall; the pressure roller peel grinding set (9D) is a third part for grinding out the peel;

the diameter of the pressure roller (91) of the four pressure roller sets (9) is 65 to 85 mm;

the height of the axis of each pressure roller shaft (92) of the four pressure roller sets (9) is as follows:

$$w = \frac{p}{x+q} + z + b$$

in the formula, p=2642, q=35.55, x is the coordinate of X axis, z is the diameter of the pressure roller (91), and b is the thickness of peel, the value of which is in the range of 4 to 9 mm.

9. The automatic separator for peel and pulp of *Holboellia latifolia* Wall according to claim 1, wherein the brush roller set (8) comprises a brush roller (81), a pressure roller shaft (92), a bearing seat (93) and a transmission sprocket (94); the bearing seat (93) is installed above the side of the pressure roller installing platform (5) by bolts, both ends of the pressure roller shaft (92) are respectively rotatably connected with a bearing seat (93) through a bearing; a transmission sprocket (94) is installed at one end of the pressure roller shaft (92) through a pin shaft, the pressure roller shaft (92) is installed in the brush roller (81) through key connection; and brush bundles (82) are uniformly installed on the outer peripheral surface of the pressure roller (91).

10. The automatic separator for peel and pulp of *Holboellia latifolia* Wall according to claim 1, wherein the scraping device (15) comprises a scraper (151), a scraper motor (152), a scraper motor bracket (153) and a scraper installing shaft (154), wherein the scraper motor bracket (153) is fixedly connected below the screen table (18), the scraper motor (152) is installed on the scraper motor bracket (153), a power output shaft of the scraper motor (152) is fixedly connected with the scraper installing shaft (154), and the scraper installing shaft (154) faces the center of the scraping plate (11); the scraper (151) is uniformly installed on the scraper installing shaft (154), and the scraper (151) is in contact with the bottom surface of the scraping plate (11).

11. The automatic separator for peel and pulp of *Holboellia latifolia* Wall according to claim 3, wherein a limit centering device (19) is provided above the feeding barrel (41), the limit centering device consists of three identical arc-shaped limiting members (191), a collar (192), a spring (193), a collar connecting ring (194) and an arc-shaped clamping member, two adjacent limiting members (191) are connected by upper and lower springs (193), three arc-shaped limiting members (191) installed by the springs (193) enclose a frustum-shaped centering space, the axis of the centering space is the tangent of two disc cutters (441), thus ensuring that the falling position of the *Holboellia latifolia* Wall faces the position between two disc cutters (441); the collars (192) above the three arc-shaped limiting members (191) are connected through a collar connecting ring (194), and both ends of the collar connecting ring (194) are in sliding connection with one arc-shaped limiting member (191);

the upper and lower ends of the arc-shaped limiting member (191) are respectively fixedly connected with a collar (192) and an arc-shaped clamping member (195), a feeding barrel fixing opening allowing the feeding barrel (41) to pass through is left below the collar (192), and a limit centering device (19) is sleeved on the upper edge of the feeding barrel (41) through three feeding barrel fixing openings.

\* \* \* \* \*